United States Patent [19]

Bass et al.

[11] Patent Number: 4,760,943
[45] Date of Patent: Aug. 2, 1988

[54] PLATFORM FOR BICYCLE RACK
[75] Inventors: Morton E. Bass, Reseda; James G. Herting, San Fernando, both of Calif.
[73] Assignee: Rack Mate, Inc., San Fernando, Calif.
[21] Appl. No.: 677,972
[22] Filed: Dec. 4, 1984
[51] Int. Cl.[4] ............................................. B62J 9/00
[52] U.S. Cl. .................................... 224/39; 224/30 R
[58] Field of Search ...................... 224/30 R, 38, 39, 31
[56] References Cited

U.S. PATENT DOCUMENTS

| | | | |
|---|---|---|---|
| 3,406,885 | 10/1968 | Zurmuhlen | 224/39 |
| 3,921,868 | 11/1975 | Reichbach | 224/39 X |
| 4,154,382 | 5/1979 | Blackburn | 224/39 |
| 4,353,490 | 10/1982 | Jackson et al. | 224/39 X |

FOREIGN PATENT DOCUMENTS

| | | | |
|---|---|---|---|
| 818158 | 10/1951 | Fed. Rep. of Germany | 224/39 |
| 2538074 | 3/1977 | Fed. Rep. of Germany | 224/39 |

Primary Examiner—Henry J. Recla
Assistant Examiner—Robert M. Petrik
Attorney, Agent, or Firm—Keith D. Beecher

[57] ABSTRACT

A plastic platform constructed to be snapped onto a carrier rack of the type which is mounted over the front or rear wheel of a bicycle. The platform serves as a support to prevent articles from falling through the rack onto the rear tire, and also a fender to protect the articles, as well as the back of the rider, from water and mud sprays. The platform is scored so that its end portion may be bent up to follow the contour of the carrier rack. The platform may be mounted with different orientations as dictated by the type of the rack. Moreover, the platform has slots which not only serve to receive the supporting straps and bungie cords of bags and panniers, but which also serve to permit the platform to be strapped onto carrier racks which are of inappropriate sizes and/or shapes to enable the platform to be snapped thereon.

1 Claim, 1 Drawing Sheet

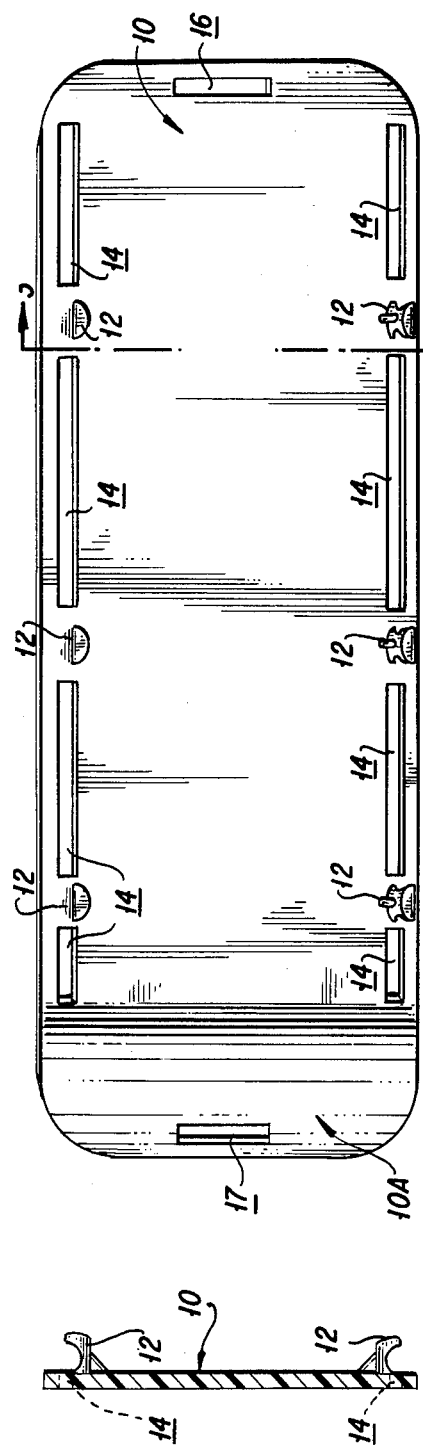
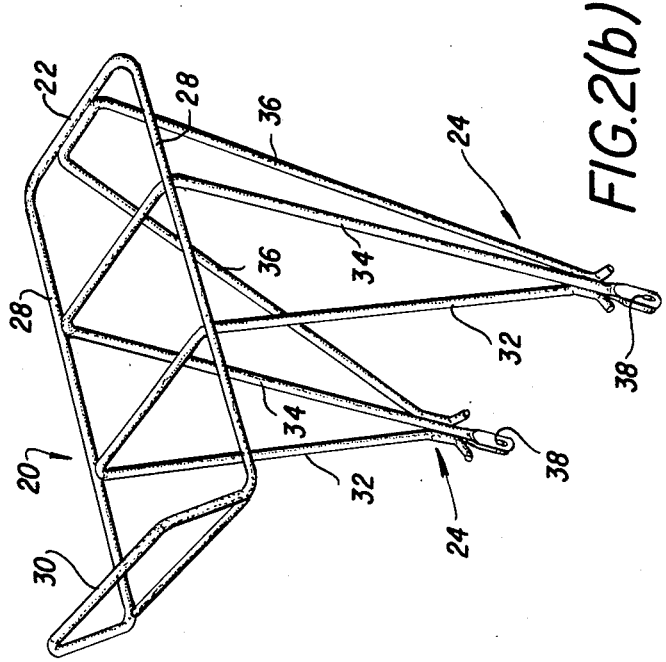
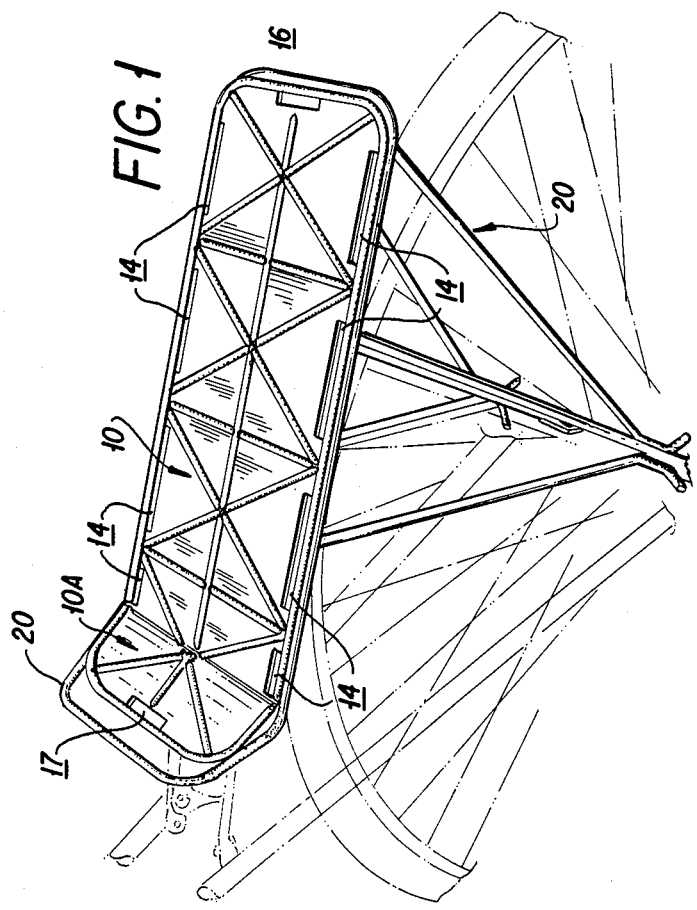

PLATFORM FOR BICYCLE RACK

BACKGROUND OF THE INVENTION

Front and rear carrier racks for bicycles which are formed of tubular members, and which straddle the rear and/or front wheels, are known to the art. Such racks are useful for carrying a variety of articles while the rider's hands remain free to steer the bicycle. One such carrier rack is described, for example, in U.S. Pat. No. 4,383,625.

The present invention provides a plastic platform which is constructed to snap over the top of existing carrier racks, such as the rack described in the patent, to provide a more positive support for articles carried on the rack, and also to serve as a protection for the articles and for the rider against water and mud sprays. As mentioned above, the platform is slotted to enable it to be strapped onto racks of a size and shape such that it cannot conveniently be snapped onto such racks, and the slots also serve as a mounting means for bag and/or pannier straps and/or bungie cords.

BRIEF DESCRIPTION OF THE DRAWING

FIG. 1 is a perspective view showing one embodiment of the plastic platform of the invention snapped onto the rear carrier rack of a bicycle; and FIG. 2(a) is a bottom view of the platform of FIG. 1;

FIG. 2 (b) is a perspective view of the carrier rack of FIG. 1; and

FIG. 3 is a sectional view of the paltform, taken along the lines 3—3 of FIG. 2(a).

DETAILED DESCRIPTION OF THE ILLUSTRATED EMBODIMENT

The plastic platform of the invention in the illustrated embodiment is designated generally as 10, and it is supported on the carrier rack 20 of a bicycle. The platform is formed of a plastic material which is sufficiently flexible to permit its end portion 10a to be turned up about a scoreline to conform with the up-turned end portion of the carrier rack.

The platform is equipped with slots 14 along each side to receive the straps of bags containing articles to be transported by the bicycle, with the bags being strapped either to the top of the platform, or suspended as panniers from the sides of the platform. The platform also includes end slots 16 and 17 which enable the platform to be secured to types of racks which do not have an appropriate configuration or size to receive the platform with a snap-on relationship.

A plurality of snap members 12 (FIGS. 2(a) and 3 are integrally formed on the underside of the platform, and these members have an appropriate configuration to snap over the sides of the open top of the carrier rack 20, so as to support the platform on the rack.

The carrier rack 20, as shown in FIG. 2(b), has an open top consisting of a tubular member which forms a rectangle with spaced and parallel sides 28, and with spaced and parallel ends 22 and 30. The end 30 is tilted up from the plane of the open top, as shown, to provide a barrier, and the end portion 10a of the platform may also be turned up, as shown in FIG. 1, to conform with the shape of the rack. The rack has a further U-shaped member 36 affixed to the end 22, and a U-shaped member 32 affixed to the sides 28, the two U-shaped members converging, as shown, and being attached to a further U-shaped member 34 which, in turn, is secured to the axle of the bicycle, with the axle extending through holes 38 at the lower end of the U-shaped member 34.

An important feature of the platform of the invention is that it can be snapped onto, or otherwise affixed to existing carrier racks, so as to realize the additional advantages provided by the platform, as enumerated above. The snap-on feature enables the platform to be moved to different positions on the carrier rack, or from the front to the rear rack, as the conditions dictate. Moreover, the platform may be mounted with different orientations, to fulfill different requirements.

The top surface of the platform is preferably beaded to help prevent bags, or other gear from sliding along the platform. The hinged end portion 10a of the platform enables the rack to conform with different style racks, and even to be used backward as a fender, or forward to prevent bags or other gear from sliding forwardly. The one-piece universal snap fit of the platform enables it to be quickly mounted on a rack, and to be interchanged from bicycle-to-bicycle and rack-to-rack without the requirement of any tools or special mechanical skills.

It will be appreciated that while a particular embodiment of the invention has been shown and described, modifications may be made. The following claims are intended to cover all modifications which come within the true spirit and scope of the invention.

We claim:

1. A platform to be snapped over the open top of a bicycle carrier rack, the carrier rack being formed of a first tubular member configured to define a rectangular open top for the rack with the first tubular member forming spaced and parallel sides and spaced and parallel ends for the open top, and further tubular members secured to the first tubular member and extending downwardly from opposite sides of the top to be attached to the frame of the bicycle adjacent to one of the axles thereof; said platform comprising a rectangular strip of resilient plastic material dimensioned to extend across and close the open top of the rack, said strip having an integral hinged end portion to conform with an upwardly tilted portion of the carrier rack, and a series of resilient plastic discrete snap members integral with the underside of said strip at the respective side edges thereof, said discrete snap members extending downwardly from said strip and configured to snap over the first tubular member removably to mount the platform on the carrier rack, said strip having a series of slots therein at the respective side edges thereof for receiving staps, bungie cords, and the like, for supporting bags and panniers on the platform.

* * * * *